March 21, 1944.  J. H. HOLSTEIN  2,344,871
SHAKER CONVEYER
Filed Feb. 28, 1942  4 Sheets-Sheet 2
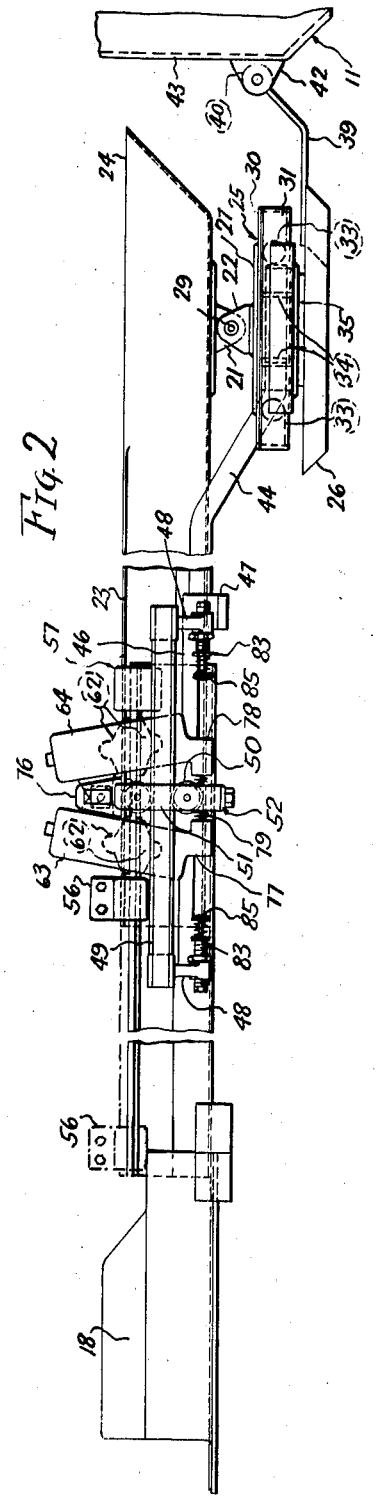
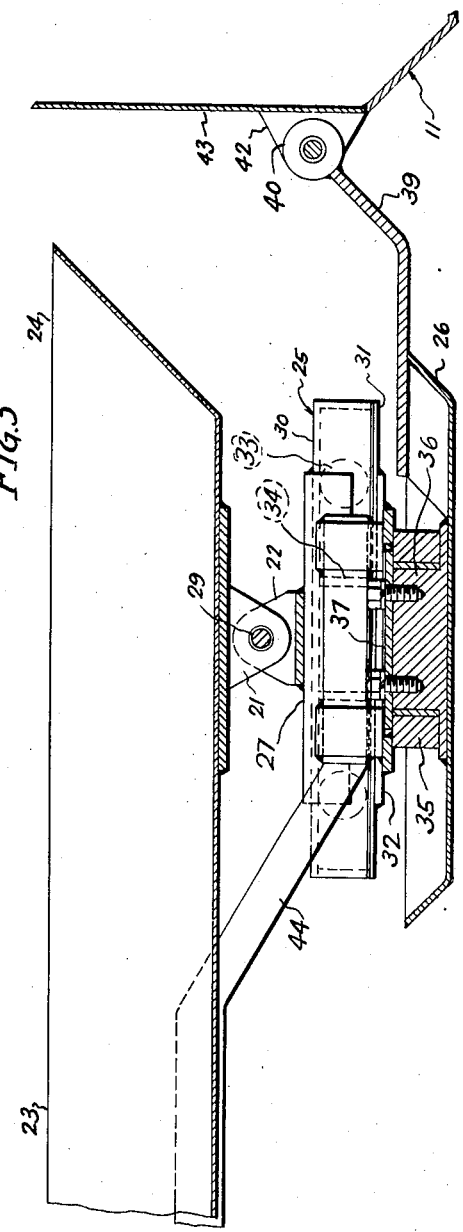
INVENTOR.
John H. Holstein
BY
Clarence F. Poole
ATTORNEY March 21, 1944.    J. H. HOLSTEIN    2,344,871
SHAKER CONVEYER
Filed Feb. 28, 1942    4 Sheets-Sheet 3
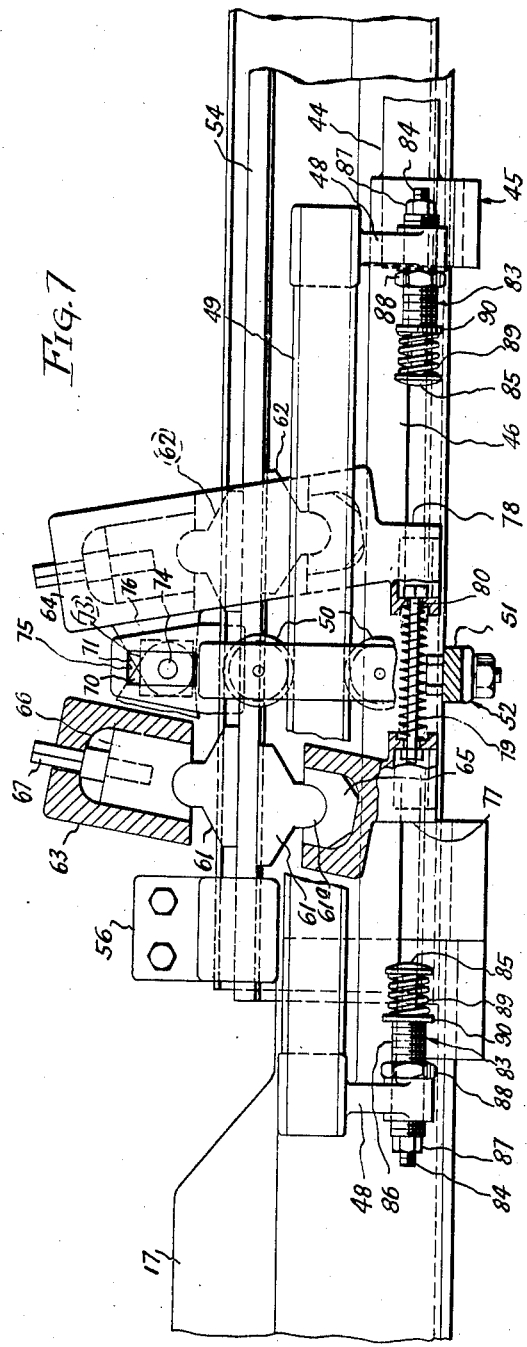
INVENTOR.
John H. Holstein
BY Clarence F. Poole
ATTORNEY March 21, 1944.   J. H. HOLSTEIN   2,344,871
SHAKER CONVEYER
Filed Feb. 28, 1942   4 Sheets-Sheet 4
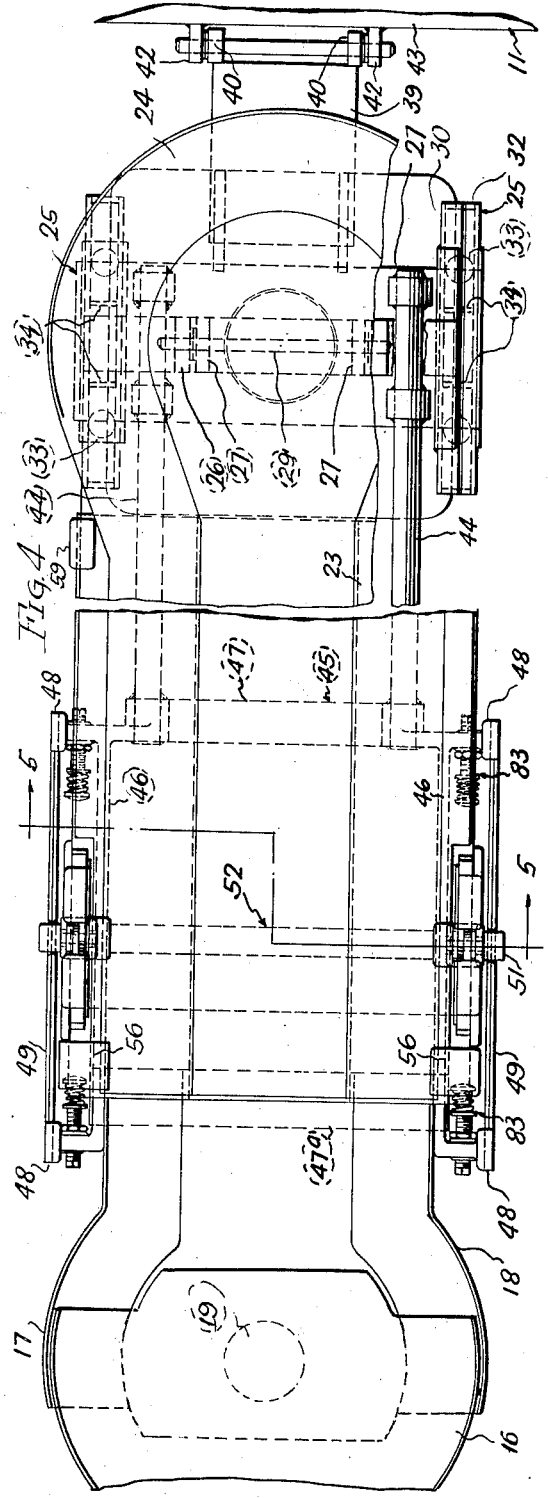
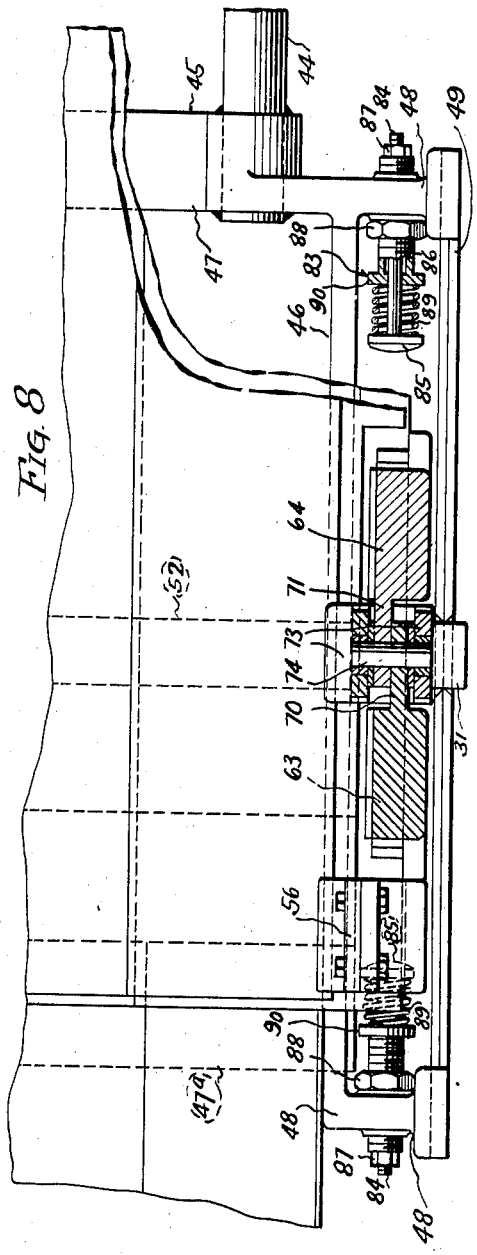
INVENTOR.
John H. Holstein
BY Clarence F. Poole Patented Mar. 21, 1944

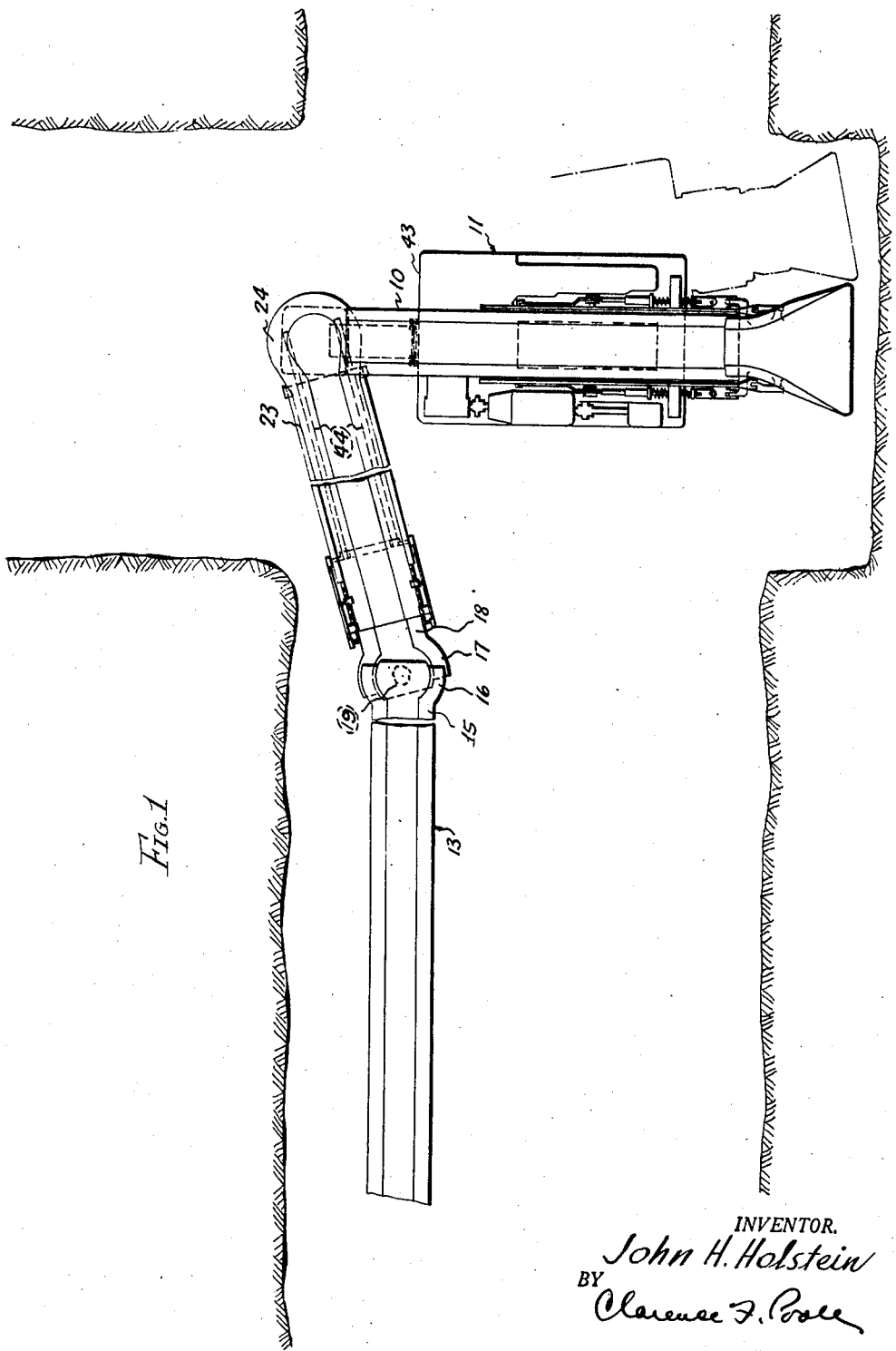

2,344,871

UNITED STATES PATENT OFFICE 2,344,871

SHAKER CONVEYER

John H. Holstein, Chicago, Ill., assignor to Goodman Manufacturing Company, Chicago, Ill., a corporation of Illinois Application February 28, 1942, Serial No. 432,786

18 Claims. (Cl. 198—14)

This invention relates to improvements in shaker conveyers, and more particularly relates to a material transferring means adapted to transfer material from a mobile loading device onto the inby end of a shaker conveyer trough line.

The principal objects of my invention are to provide an extensible connecting means between the inby end of a shaker conveyer trough line and a mobile loading device, for continuously transferring material from the loading device to the trough line without interruption as the loading device is moving about during the loading operation.

In carrying out my invention I provide a trough section communicating with and driven by the inby end of a shaker conveyer trough line and mounted for lateral movement with respect thereto, and connect this swingable trough to the loading device by means of an extensible trough section mounted for telescopic movement with respect to said reciprocating trough section and connected to the loading device in receiving relation with respect thereto. I also provide a releasable drive connection between these trough sections, arranged to reciprocably drive the extensible trough section and to permit the loading device to extend the extensible trough section while moving away from the shaker conveyer trough line and while said telescopic trough section is being reciprocably driven by the shaker conveyer trough line, so the two trough sections will act as a shaker conveying means and continuously progress material from the loading device to the trough line.

Other objects of my invention will appear from time to time as the following specification proceeds and with reference to the accompanying drawings wherein:

Figure 1 is a diagrammatic plan view of a section of a mine showing a loading device in position to pick up material from a working place in the mine and showing a material transferring device constructed in accordance with my invention connecting the discharge end of the loading device with the receiving end of the shaker conveyer trough line;

Figure 2 is an enlarged view in side elevation of the material transferring device shown in Figure 1;

Figure 3 is an enlarged detail fragmentary longitudinal sectional view taken through the receiving end of the material transferring device;

Figure 4 is an enlarged plan view of the material transferring device shown in Figure 1, with certain parts broken away in order to more clearly illustrate certain details of my invention;

Figure 5 is a transverse sectional view taken substantially along line 5—5 of Figure 4;

Figure 6 is an enlarged detail fragmentary transverse sectional view showing certain details of the guiding connection between the two troughs of the material transferring device;

Figure 7 is an enlarged view in side elevation of the material transferring device with certain parts broken away and certain other parts shown in longitudinal section; and Figure 8 is an enlarged detail partial fragmentary view of the material transferring device, with certain parts shown in horizontal section in order to illustrate certain details of the means for causing the two trough sections to move together or permitting them to be telescopically extended or retracted with respect to each other.

In the drawings, the device embodying my invention is shown as being disposed beneath and in receiving relation with respect to the discharge end of a conveyer 10 of a face loading device 11, to which it is pivotally connected, and as being pivotally connected at its other end to and communicating with the inby end of a shaker conveyer trough line generally indicated by reference character 13.

The face loading device 11 may be of any well known form having a conveyer extending therealong for discharging the loaded material into a suitable material collecting device, and is herein shown as being a shaker conveyer loading device of a type similar to that illustrated and described in a companion application Serial No. 432,436, filed on February 26, 1942, by William W. Sloane, and now Patent No. 2,322,481.

The shaker conveyer trough line 13 may be of any usual construction, driven from a suitable conveyer drive mechanism and, as herein shown, includes a trough section 15 at its receiving or inby end, which has an outwardly flared curved receiving end 16, herein shown as being nested within an outwardly flared discharge end 17 of a reciprocating connecting trough section 18 of the material transferring means of my invention. The trough sections 15 and 18 are pivotally connected together by a pivotal pin 19, depending from said trough section 15 and extending through a suitable bearing member (not shown), formed in the trough section 18.

An extensible trough section 23 is mounted for telescopic movement with respect to the connecting trough section 18 and has a curved hopper-like forward end, indicated by reference character 24, arranged in receiving relation with respect to the trough section 10 of the face loading device 11.

The forward end of the extensible trough section 23 is reciprocably mounted on a ball frame 25, which in turn is mounted on a ground-engaging shoe 26, for pivotal movement with respect thereto about a vertical axis. The connection between said extensible trough section and said ball frame includes a pair of laterally spaced connecting ears 21, 21 depending from said extensible trough section and abutting the insides of a pair of spaced ears 22, extending upwardly from an upper frame member 27 of said ball frame and pivotally connected to said upstanding ears by means of a transverse pivotal pin 29. The upper frame member 27 of the ball frame 25 includes a pair of parallel spaced longitudinally extending guide races 30, 30 closed at their ends. Said races are herein shown as being of a semi-circular formation and the open sides thereof open to the outer side of said frame member at an angle facing the ground. Said races face similar outer guide races 31, 31 of a lower frame member 32 of said ball frame. Said upper frame member is slidably supported on said lower frame member by means of a plurality of balls 33, 33, rolling in said races. Spaced dividers 34, 34 extend transversely of said upper guide races to hold said balls apart. Similar dividers are mounted in said lower guide races and are spaced in said guide races in the same manner said dividers 34, 34 are spaced in said upper guide races. Said dividers 34, 34 are secured to the insides of said guide races and substantially conform to the form thereof. Said dividers are herein shown as being spaced equally from the ends of said guide races, distances slightly greater than the stroke of the conveyer to provide stops for said balls 33, 33 and to form abutments so bodily movement of the shoe 26 will cause movement of the upper frame member and trough 23 through said balls, said balls abutting said dividers and the closure members on the ends of said races during this movement.

The pivotal connection between the lower frame 32 of the ball frame 25 and the shoe 26 includes a depending annular ring 35 secured thereto and rotatably mounted on a boss 36, projecting upwardly from said shoe. A retaining plate 37 is secured to the upper end of said boss and abuts the upper side of said annular ring, to prevent vertical displacement of said annular ring and lower frame of said ball frame with respect to said shoe.

The connection from the shoe 26 to the loading device 11 includes a coupling arm 39 extending forwardly from said shoe and angularly upwardly therefrom. Said coupling arm is provided with a pair of laterally spaced eyes 40, 40 on its outer end, which are herein shown as extending between and as being transversely pivoted to a pair of laterally spaced connecting ears 42, 42, which project rearwardly from a side wall 43 of the frame of said loading device.

The support for the rear end of the extensible trough section 23 and the forward end of the connecting trough section 18 includes a pair of parallel spaced arms 44, 44 secured at their forward ends to the lower frame 32 of the ball frame 25 in a suitable manner, such as welding (see Figure 3). Said arms extend angularly upwardly from said lower frame to a plane substantially coincident with the lower plane surface of the extensible trough section, and then extend horizontally along said extensible and connecting trough sections in a rearward direction to a frame 45, to which they are connected at their rear ends. The frame 45 is of an open U-shaped formation and extends beneath and rearwardly and upwardly along opposite sides of the connecting and extensible trough sections 18 and 23 and includes a pair of side frame members 46, 46 extending along each side of said connecting and extensible trough sections. Said side frame members are connected together at their forward and rear ends by substantially U-shaped connecting pieces 47, 47a, respectively.

A pair of spaced brackets 48, 48 project laterally from opposite ends of said frame, adjacent each end thereof and form supports at their upper ends for opposite ends of supporting and guiding members 49, 49 extending along and spaced outwardly from each side of the trough sections 18 and 23 (see Figures 4, 5 and 7).

The rear end of said extensible trough section is slidably mounted on the supporting and guiding members 49, 49 on grooved rollers 50, 50. The grooves of said rollers have engagement with V-shaped upper and lower guide surfaces formed on opposite sides of said supporting and guiding members. Said rollers are mounted in upright sides 51, 51 of a frame 52, for rotation about parallel spaced transverse axes. Said frame is mounted on and depends from opposite upper edges of the trough 23 and is herein shown as being of a sectional construction, extending transversely beneath the bottoms of the extensible and connecting trough sections and upwardly along opposite sides thereof. Said upright sides of said frame have inwardly extending portions 53, 53, herein shown as being welded to the upper edges of said extensible trough section (see Figure 5).

The guiding connection between the extensible and connecting trough sections includes a pair of bearing plates 54, 54 extending outwardly from the upper edges of said connecting trough section. Said bearing plates are slidably guided in inwardly opening guides 55, 55 of guide members 56, 56. Said guide members are secured to the upper edges of the extensible trough section 23 adjacent the rear end thereof (see Figure 6). Said guide members, besides forming guides for said reciprocating trough section, are adapted to form stops to limit extensible movement of said trough section.

Retaining guides 57, 57 are secured to the undersides of the bearing plates 54, 54, adjacent the forward ends thereof. Said guides have an inwardly extending retaining portion 59 extending over and having slidable engagement with the upper edges of the extensible trough section 23 (see Figure 5). Said retaining guides besides forming a means for guiding said trough sections for telescopic movement, also form stops to limit retractible movement of said extensible trough section with respect to said connecting trough section.

Referring now in particular to the means for reciprocably moving the extensible trough section 23 with the reciprocating trough section 18, to cause material to move from said extensible to said reciprocating trough section and for permitting extension of said extensible trough section with respect to said reciprocating trough section, two pairs of opposed friction grip blocks 61, 61 and 62, 62 are mounted in carrier members 63 and 64, respectively. Said carrier members are mounted on opposite sides of the conveyer and the grip blocks thereof are adapted to have gripping engagement with the upper and lower sides of bearing plates 54, 54. The carrier members 63, 63 and grip blocks 61, 61, associated therewith, are adapted to move said extensible trough section with said reciprocating trough section upon the return strokes of the conveyer, and the carrier members 64, 64 and grip blocks associated therewith are adapted to move said extensible trough section with said reciprocating trough section upon the forward strokes of the conveyer. Since the gripping mechanism on each side of the conveyer is the same, the mechanism on one side only will herein be described in detail.

Each carrier member 63 is of a substantially C-shaped formation opening towards the bearing plate 54, to permit said bearing plate to extend within the opening thereof and be engaged by the grip blocks carried therein. As herein shown, the lower grip block 61 of the carrier member 63 has an integrally formed depending arcuate lug 61a having pivotal bearing engagement with a socket formed in the upper end of a bearing plate 65, guided in the lower portion of said carrier member (see Figure 7). Similarly, the upper grip block 61 has pivotal bearing engagement with a bearing plate 66, guided in the upper portion of said carrier member. Said upper bearing plate is connected at its upper end with an adjusting screw 67, which is provided to adjust the distance between said grip blocks and the gripping action of said grip blocks. The carrier member 64 is of a construction similar to the carrier member 63 so will not herein be shown or described in detail.

A connecting ear 70 extends forwardly from the carrier member 63 and overlaps a connecting ear 71 extending rearwardly from the carrier member 64 (see Figure 7). Guide blocks 73, 73 abut the outer sides of said connecting ears 70 and 71 and are pivotally secured to said connecting ears by a pivotal pin 74. Said guide blocks are slidably guided in upright rectilinear guides 75, 75, formed in upright brackets 76, 76, extending upwardly from the upper side of the inwardly extending portion 53 of the U-frame 52 (see Figure 5).

The carrier members 63 and 64 are provided with depending lugs 77 and 78, respectively, between which is interposed a compression spring 79, which tends to move the lower ends of said carrier members away from each other about the axis of the pivotal pin 74. Said compression spring is held in position by means of a threaded rod 80 extending therethrough and through said lugs 77 and 78, and is arranged to permit slidable movement of said lugs with respect to said rod. The strength of said compression spring is such as to engage the grip blocks 61, 61 and 62, 62 with the bearing plate 54 with sufficient force to cause reciprocable movement of the extensible trough section with the reciprocating trough section during operation of the conveyer, but to permit the face loading device 11 to extend or retract said extensible trough section with respect to said reciprocating trough section.

A centering and releasing means is provided to release either of the grip blocks 61, 61 or 62, 62 from the bearing plate 54, when the upper frame 27 of the ball frame 25 is out of centered relation with respect to the lower frame 32 of said ball frame; caused by the fact that said upper frame is relatively movable with respect to said lower frame and that bodily movement of said extensible trough section is effected by engagement of the balls 33, 33 with the dividers 34, 34 and the closure members for the ends of the guides 30, 30 and 31, 31 of said upper and lower frame members. Said centering and releasing means, as herein shown, comprises a pair of facing longitudinally spaced yieldable stops 83, 83 adapted to engage the lugs 77 and 78 respectively. Said stops are mounted on the brackets 48, 48 and are spaced apart a distance equal to substantially twice the stroke of the conveyer plus the distance between the engaging ends of said lugs 77 and 78. As herein shown, said stops extend longitudinally from the brackets 48, 48 in directions towards the lugs 77 and 78, and each includes a yieldable plunger consisting of a threaded rod 84 having a button 85 on its end adjacent the carrier members 63 and 64. Said rod is slidably mounted in a threaded sleeve 86, threaded in the bracket 48 and is retained on said sleeve by means of a nut 87, threaded on its outer end. A nut 88, threaded on said sleeve, locks said sleeve in position on said bracket. A compression spring 89 is interposed between the inside of said button and a collar 90, on the inner end of said threaded sleeve, to urge each of said stops in a direction towards its respective carrier member.

At the central part of the forward or return strokes of the conveyer, when the upper frame member 27 is in centered relation with respect to the lower frame member 32, the distances between the buttons 85, 85 of the stops 83, 83 and the adjacent engaging ends of the respective lugs 77 and 78 will be substantially equal to the stroke of the conveyer plus a slight additional distance, for clearance, to take care of any variations in the stroke of the conveyer. Thus during normal operation of the conveyer, the outer engaging faces of the lugs 77 and 78 will move between the buttons 85, 85 and will not come into engagement with said buttons. When, however, due to movement of the face loading device, the extensible trough section is moved so the upper frame 27 of the ball frame 25 is out of centered relation with respect to the lower frame 32 of said ball frame, the engaging face of either one or the other lug 77 or 78 will be engaged with the respective button 85. Engagement of either of said lugs with said respective button will pivot the respective carrier member to a position to release the grip blocks carried thereby, and permit movement of the reciprocating trough section with respect to the extensible trough section until a point is reached where the outer engaging ends of the lugs 77, 78 move equal distances between the buttons 85, 85.

It should here be noted that the portion of the stroke of the conveyer that said grip blocks are released depends upon the amount the upper frame of the ball frame is off center with respect to the lower frame, and that as the upper frame approaches a centered position, the grip blocks will be released for a shorter part of the stroke of the conveyer than when it is in an extreme off center position.

Upon forward movement of the face loading device, the shoe 26 and lower frame member 32 of the ball frame 25 will move with respect to the upper frame member of said ball frame until the balls 33, 33 engage the rear retaining member of the lower guide members and the dividing members of said guide members. At this time the lug 77 will be engaged by the rear button 85. This will cause the grip blocks 61, 61 to be released from bearing plates 54, 54 of the reciprocating trough section and will stop return movement of the extensible trough section, but will permit forward movement of said extensible trough section until the upper frame member of the ball frame has been moved into centered relation with respect to the lower frame member of said ball frame. At this point the distance between said lug and the button 85 will be substantially equal to the stroke of the conveyer.

Upon retractible movement of the extensible trough section caused by movement of the face loading device towards the conveyer trough line, the lower frame member of the ball frame 25 will be moved rearwardly with respect to the upper frame member of said ball frame until said lower frame member moves said upper frame member rearwardly through the balls 33, 33. When these frame members are out of centered relation with respect to each other, due to movement of the shoe 26, the lug 78 will engage the forward button 85, to release the grip blocks 62, 62 from the reciprocating trough section upon the forward strokes of the conveyer until the upper frame member has been moved to centered relation with respect to said lower frame member. At this time, the distance between said button and lug will be substantially equal to the stroke of the conveyer.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, means extraneous of and movable with respect to said connecting trough section and connected with said extensible trough section for moving said extensible trough section therewith and extensibly or retractibly moving said extensible trough section with respect to said connecting trough section, and means for reciprocably moving said extensible trough section with said connecting trough section and permitting said extensible trough section to be extensibly or retractibly moved with respect to said connecting trough section by said extraneous means during reciprocable movement of said connecting trough section.

2. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, means extraneous of and movable with respect to said connecting trough section and connected with said extensible trough section for moving said extensible trough section therewith and extensibly or retractibly moving said extensible trough section with respect to said connecting trough section, and friction gripping means for reciprocably moving said extensible trough section with said connecting trough section and permitting said extensible trough section to be extensibly or retractibly moved with respect to said connecting trough section by said extraneous means during reciprocable movement of said connecting trough section.

3. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, means extraneous of and movable with respect to said connecting trough section and connected with said extensible trough section for moving said extensible trough section therewith and extensibly or retractibly moving said extensible trough section with respect to said connecting trough section, means for reciprocably moving said extensible trough section with said connecting trough section and permitting said extensible trough section to be extensibly or retractibly moved with respect to said connecting trough section by said extraneous means during reciprocable movement of said connecting trough section including a pair of friction grip blocks having connection with one trough section and engagement with said other trough section, and means for yieldably engaging said friction grip blocks with said other trough section with sufficient force to reciprocably drive one trough section from the other, but to permit one trough section to be extensibly or retractibly moved with respect to the other.

4. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, a shoe slidably engageable with the ground, means on said shoe for supporting said extensible trough section for reciprocable movement with respect thereto, and means connecting said trough sections together for reciprocably driving said extensible trough section from said connecting trough section and permitting said extensible trough section to be extensibly and retractibly moved with respect to said connecting trough section by movement of said shoe about the ground in directions towards and from said connecting trough section.

5. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, a shoe slidably engageable with the ground, means on said shoe for supporting said extensible trough section for reciprocable movement with respect thereto, and means connecting said trough sections together for reciprocably driving said extensible trough section from said connecting trough section and permitting said extensible trough section to be extensibly and retractibly moved with respect to said connecting trough section by movement of said shoe about the ground in directions towards and from said connecting trough section including a pair of friction grip blocks connected with one trough section, yieldable means for engaging said friction grip blocks with said other trough section with sufficient force to reciprocably drive said extensible trough section from said connecting trough section, but to permit movement of said shoe to extensibly or retractibly move said extensible trough section with respect to said connecting trough section.

6. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, a shoe slidably engageable with the ground, means on said shoe for supporting said extensible trough section for reciprocable movement with respect thereto, and means connecting said trough sections together for reciprocably driving said extensible trough section from said connecting trough section and permitting said extensible trough section to be extensibly and retractibly moved with respect to said connecting trough section by movement of said shoe about the ground in directions towards and from said connecting trough section including a pair of friction grip blocks connected with one trough section, yieldable means for engaging said friction grip blocks with said other trough section with sufficient force to reciprocably drive said extensible trough section from said connecting trough section, but to permit movement of said shoe to extensibly or retractibly move said extensible trough section with respect to said connecting trough section, and means for disengaging said friction grip blocks from its associated trough section when said extensible trough section is out of centered relation with respect to said shoe.

7. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, a shoe slidably engageable with the ground, means on said shoe for supporting said extensible trough section for reciprocable movement with respect thereto, and means connecting said trough sections together for reciprocably driving said extensible trough section from said connecting trough section and permitting said extensible trough section to be extensibly and retractibly moved with respect to said connecting trough section by movement of said shoe about the ground in directions towards and from said connecting trough section, two pairs of friction grip blocks connected with one trough section, and yieldable means for engaging said grip blocks with said other trough section so one pair of said grip blocks will cause movement of said extensible trough section with said connecting trough section during one stroke of the conveyer and said other pair of grip blocks will cause movement of said extensible trough section with said connecting trough section the other stroke of the conveyer, but will permit movement of said shoe to extensibly or retractibly move said extensible trough section with respect to said connecting trough section.

8. In a material transferring means for a shaker conveyer trough line, a connecting trough section communicating with and mounted for lateral swinging movement with respect to the shaker conveyer trough line and reciprocably driven thereby, an extensible trough section mounted for telescopic movement with respect to said connecting trough section, a shoe slidably engageable with the ground, means on said shoe for supporting said extensible trough section for reciprocable movement with respect thereto, and means connecting said trough sections together for reciprocably driving said extensible trough section from said connecting trough section and permitting said extensible trough section to be extensibly and retractibly moved with respect to said connecting trough section by movement of said shoe about the ground in directions towards and from said connecting trough section, two pairs of friction grip blocks connected with one trough section, and yieldable means for engaging said grip blocks with said other trough section so one pair of said grip blocks will cause movement of said extensible trough section with said connecting trough section during one stroke of the conveyer and said other pair of grip blocks will cause movement of said extensible trough section with said connecting trough section the other stroke of the conveyer, but will permit movement of said shoe to extensibly or retractibly move said extensible trough section with respect to said connecting trough section, and a pair of spaced apart stops having connection with said shoe for disengaging one or the other of said pairs of grip blocks from its associated trough section when said extensible trough section is out of centered relation with respect to said shoe, for causing said extensible trough section to be moved into centered relation with respect to said shoe by reciprocable movement of said connecting trough section.

9. In a shaker conveyer and in combination with a shaker conveyer trough line, a reciprocating trough section on the forward end of the shaker conveyer trough line, a mobile loading device movable about the ground independently of said reciprocating trough section, and means connected with the forward end of said reciprocating trough section and connected with and arranged in cascade relation with respect to the discharge end of said loading device for transferring material from said loading device to said reciprocating trough section as said loading device is moving about the ground including a connecting trough section communicating with and connected to said reciprocating trough section for lateral movement with respect thereto, an extensible trough section mounted for telescopic movement with respect to said connecting trough section, a connection between said extensible trough section and said loading device for moving said trough section with said loading device, and means for reciprocably moving said extensible trough section with said connecting trough section to cause movement of material from said extensible to said connecting trough section and permitting said loading device to extensibly and retractibly move said extensible trough section with respect to said connecting trough section during reciprocation of the conveyer.

10. In a shaker conveyer and in combination with a shaker conveyer trough line, a reciprocating trough section on the forward end of the shaker conveyer trough line, an independent mobile loading device movable about the ground independently of said reciprocating trough section, and means connected with the forward end of said reciprocating trough section and connected with and arranged in cascade relation with respect to the discharge end of said loading device for transferring material from said loading device to said reciprocating trough section as said loading device is moving about the ground during its gathering operation including a connecting trough section connected to the forward end of said reciprocating trough section for lateral swinging movement with respect thereto, an extensible trough section mounted for telescopic movement with respect to said reciprocating trough section, a connection between said extensible trough section and said loading device, for moving said extensible trough with said loading device, and friction gripping means connected between said connecting and extensible trough sections, for reciprocably moving said extensible trough section with said connecting trough section and permitting extensible and retractible movement of said extensible trough section with respect to said connecting trough section during reciprocation of the conveyer.

11. In a shaker conveyer and in combination with a shaker conveyer trough line, a reciprocating trough section on the forward end of the shaker conveyer trough line, a mobile loading device movable about the ground independently of said reciprocating trough section, and means connected with the forward end of said reciprocating trough section and connected with and arranged in cascade relation with respect to the discharge end of said loading device for transferring material from said loading device to said reciprocating trough section as said loading device is moving about the ground including a connecting trough section connected to the forward end of said reciprocating trough section for lateral movement with respect thereto, an extensible trough section mounted for telescopic movement with respect to said connecting trough section, a connection between said extensible trough section and said loading device, and means for reciprocably moving said extensible trough section with said connecting trough section and permitting said loading device to extensibly and retractibly move said extensible trough section with respect to said connecting trough section during reciprocation of the conveyer, including friction gripping means having connection with one of said trough sections and having gripping engagement with the other of said trough sections, yieldable means for engaging said gripping means with its respective trough section, said yieldable means being adapted to yield upon movement of said loading device and said extensible trough section towards or from said reciprocating trough section.

12. In a shaker conveyer and in combination with a shaker conveyer trough line, a reciprocating trough section on the forward end of the shaker conveyer trough line, a loading device movable with respect to said reciprocating trough section, and means connected between said reciprocating trough section and said loading device for transferring material from said loading device to said reciprocating trough section as said loading device is moving about the ground including a connecting trough section communicating with and connected to the forward end of said reciprocating trough section for lateral movement with respect thereto, a shoe slidably engageable with the ground and having connection with said loading device for movement therewith, a support mounted on said shoe for pivotal movement with respect thereto about a vertical axis, an extensible trough section mounted on said support for reciprocable movement with respect thereto, and mounted for telescopic movement with respect to said connecting trough section, said mounting of said extensible trough section on said support being adapted to move said extensible trough section with said support upon movement of said shoe about the ground, and means connecting said extensible and connecting trough sections for causing said extensible trough section to reciprocably move with said connecting trough section but permitting extensible or rectractible movement of said extensible trough section with respect to said connecting trough section.

13. In a shaker conveyer and in combination with a shaker conveyer trough line, a reciprocating trough section on the forward end of the shaker conveyer trough line, a loading device movable with respect to said reciprocating trough section, and means connected between said reciprocating trough section and said loading device for transferring material from said loading device to said reciprocating trough section during movement of said loading device about the ground including a connecting trough section communicating with the forward end of said reciprocating trough section and laterally movable with respect thereto, a shoe slidably engaging the ground and having connection with said loading device and moved therewith upon movement of said loading device about the ground, a support mounted on said shoe for pivotal movement with respect thereto about a vertical axis, an extensible trough section mounted on said support for reciprocable movement with respect thereto and mounted for telescopic movement with respect to said connecting trough section, said mounting of said extensible trough section on said support being adapted to cause movement of said extensible trough section with said support, and friction grip means connected between said extensible and connecting trough sections for causing reciprocable movement of said extensible trough section with said connecting trough section, but permitting said loading device to extend or retract said extensible trough section with respect to said connecting trough section upon movement thereof.

14. In a shaker conveyer and in combination with a shaker conveyer trough line, a reciprocating trough section on the forward end of the shaker conveyer trough line, a loading device movable with respect to said reciprocating trough section, and means connected between said reciprocating trough section and said loading device for transferring material from said loading device to said reciprocating trough section as said loading device is moving about the ground during its gathering operation including a connecting trough section pivotally connected to the forward end of said reciprocating trough section for lateral swinging movement with respect thereto, a shoe slidably engageable with the ground and having connection with said loading device and moved therewith upon movement of said loading device about the ground, a support mounted on said shoe for pivotal movement with respect thereto about a vertical axis, an extensible trough section mounted on said support for reciprocable movement with respect thereto and mounted for telescopic movement with respect to said connecting trough section, said mounting of said extensible trough section on said support being adapted to cause movement of said extensible trough section with said support upon movement of said shoe about the ground, and friction grip means connected between said extensible and connecting trough sections for causing reciprocable movement of said extensible trough section with said connecting trough section, but permitting said loading device to extend or retract said extensible trough section with respect to said connecting trough section upon movement thereof, and means having connection with said shoe and engageable with said friction grip means when said extensible trough section is out of centered relation with respect to said shoe, for releasing said friction grip means during certain strokes of the conveyer and causing said connecting trough section to maintain said extensible trough section in centered relation with respect to said support as said support moves said extensible trough section about the ground.

15. In a shaker conveyer and in combination with a shaker conveyer trough line, a reciprocating trough section on the forward end of the shaker conveyer trough line, a loading device movable with respect to said reciprocating trough section, and means connected between said reciprocating trough section and said loading device for transferring material from said loading device to said reciprocating trough section as said loading device is moving about the ground during its gathering operation including a connecting trough section pivotally connected to the forward end of said reciprocating trough section for lateral swinging movement with respect thereto, a shoe slidably engageable with the ground and having connection with said loading device for movement therewith, a support mounted on said shoe for pivotal movement with respect thereto about a vertical axis, an extensible trough section mounted on said support for reciprocable movement with respect thereto and mounted for telescopic movement with respect to said connecting trough section, said mounting being adapted to cause movement of said extensible trough section with said support, and friction grip means connected between said extensible and connecting trough sections for causing reciprocable movement of said extensible trough section with said reciprocating trough section, but permitting said loading device to extend or retract said extensible trough section with respect to said connecting trough section upon movement thereof, and a pair of longitudinally spaced stops connected with said shoe and adapted to release said friction grip means during certain strokes of the conveyer when said extensible trough section is out of centered relation with respect to said shoe, to cause said connecting trough section to maintain said extensible trough section in centered relation with respect to said shoe as said shoe moves said extensible trough section about the ground.

16. In a shaker conveyer, a reciprocating trough section, another reciprocating trough section independent of and spaced from said first mentioned reciprocating trough section and mounted for movement about the ground, and extensible reciprocating trough means for transferring material from one trough section to the other in all positions of said movable trough section with respect to said first mentioned trough section including an extensible reciprocating trough communicating with and having pivotal connection with said first mentioned reciprocating trough section and arranged in cascade relation with respect to the discharge end of said movable trough section, and a connection between said independently movable trough section and said extensible reciprocating trough section, for causing said extensible trough to follow said independent trough during movement thereof about the ground.

17. In a shaker conveyer, a reciprocating trough section, another reciprocating trough section independent of and spaced from said first mentioned reciprocating trough section and mounted for movement about the ground, and extensible reciprocating trough means for transferring material from one trough section to the other in all positions of said movable trough section with respect to said first mentioned trough section including an extensible reciprocating trough section communicating with and having pivotal connection with said first mentioned reciprocating trough section and arranged in cascade relation with respect to the discharge end of said movable trough section, a connection between said movable trough section and said extensible trough for extending or retracting said extensible trough by movement of said movable trough towards and away from said reciprocating trough section, and means for reciprocably driving said extensible trough from said reciprocating trough section, and permitting said movable trough to extend or retract said extensible trough.

18. In a shaker conveyer, a reciprocating trough section, a conveyer spaced from said reciprocating trough section and mounted for movement with respect to said reciprocating trough section about the ground independently of said reciprocating trough section, and means for transferring material from said conveyer to said reciprocating trough section during movement of said conveyer about the ground including a connecting trough section pivotally connected with the receiving end of said reciprocating trough section for lateral swinging movement with respect thereto and reciprocably driven thereby, an extensible trough section mounted for telescopic movement with respect to said connecting trough section and arranged in cascade relation with respect to said conveyer, a connection between said extensible trough section and said conveyer, for moving said trough section with said conveyer but permitting reciprocable movement of said extensible trough section with said connecting trough section, and means connecting said connecting and extensible trough sections, for reciprocably moving said extensible trough section with said connecting trough section, but permitting bodily movement of said conveyer along the ground to telescopically move said extensible trough section with respect to said connecting trough section.

JOHN H. HOLSTEIN.